May 21, 1963 N. VON RUCKER 3,090,468
DISK BRAKE CONSTRUCTION FOR VEHICLES
Filed Oct. 24, 1960
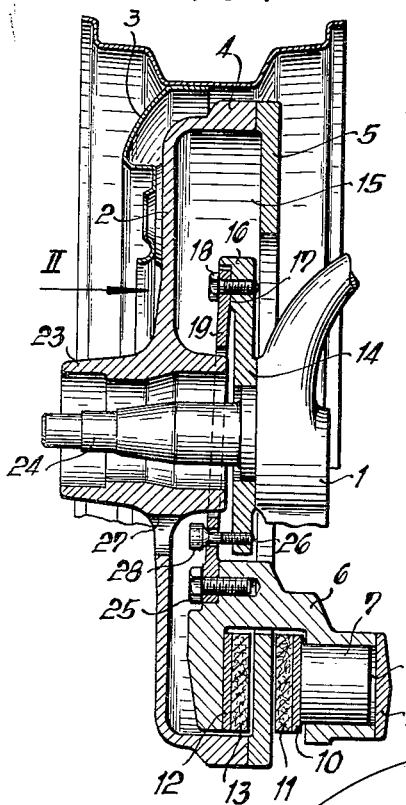
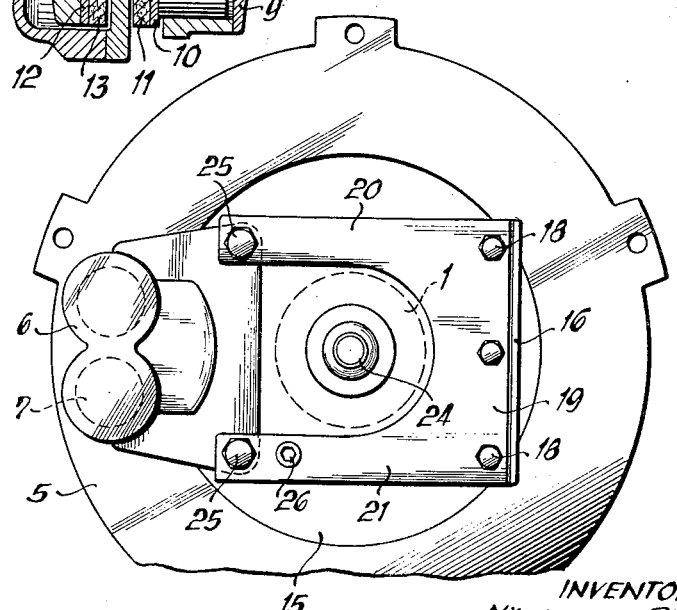
INVENTOR
Nikolaus von RÜCKER
ATTORNEYS United States Patent Office 3,090,468
Patented May 21, 1963

3,090,468
DISK BRAKE CONSTRUCTION FOR VEHICLES
Nikolaus von Rucker, Stuttgart, Germany, assignor to Firma Dr. Ing. h.c. F. Porsche KG
Filed Oct. 24, 1960, Ser. No. 64,529
Claims priority, application Germany Nov. 13, 1959
6 Claims. (Cl. 188—73)

The present invention relates to a disk brake for vehicles with a brake clamp surrounding the brake disk which brake is movably secured at a stationary bracket or support and includes a hydraulic cylinder.

Disk brake constructions are known in the prior art in which the brake clamp is connected with a bracket which is pivotally mounted or retained about a pivot bolt between the brake carrier and the brake disk. This type of mounting is unstable whereby, upon release of the brake clamp of the brake, rattle noises occur. In order to eliminate these disadvantages it has already been proposed in the prior art to connect the brake clamp with a two-armed swinging yoke whereby a coil spring and an adjusting mechanism are inserted between the stationary and the pivotal arm thereof. The rattle noises of the brake are thereby avoided. However, such mounting is relatively disadvantageous because it involves numerous parts and a relatively higher cost in manufacture due to the required pivot bearing. Additionally, this type of brake requires a relatively large mounting base with a correspondingly large proportion in the space requirement for the coil spring and, as a result thereof, can be accommodated within the wheel rim only by the use of specially shaped parts that are relatively difficult to manufacture.

According to the present invention, these disadvantages of the prior art are avoided by constituting the mounting by a leaf spring connected with the stationary bracket. By the use of such an arrangement, it is possible to arrive at a suspension of the brake clamp, free of noises, with relatively few parts of simple construction, together with the elimination of a pivot bearing, whereby a considerable reduction in cost is achieved. Added to this is the fact that assembly inaccuracies may be compensated for by the leaf spring inherently capable of being twisted so that no canting or tilting of the brake member takes place with respect to the brake disk. If the bracket is thereby connected with the wheel carrier or axle spindle, then there results therefrom a particularly space-saving construction by reason of the fact that the leaf spring consists of a member shaped in a fork-arm-like manner the leg portions of which enclosed therebetween the wheel hub. The leaf spring and the mounting thereof can therefore be readily accommodated within the available space between the brake disk and the support or carrier thereof. A readjusting mechanism is advantageously arranged between the bracket and the leaf spring whereby the brake clamp may be readjusted correspondingly to the wear of the friction lining. A simple construction thereof may be realized by the fact that the leaf spring is adjustably mounted with respect to the brake disk by means of a set screw.

Accordingly, it is an object of the present invention to provide a disk brake construction for vehicles which eliminates the shortcomings and inadequacies of the prior art construction.

It is another object of the present invention to provide a disk brake construction for vehicles in which the clamping means for the brake is mounted in such a way as to avoid any rattles or other annoying noises.

Still another object of the present invention resides in the provision of a disk brake for motor vehicles in which the various parts are of simple construction, few in numbers and so arranged and assembled as to assure a rattle-free operation thereof.

A further object of the present invention resides in the provision of a disk brake construction eliminating the disadvantages mentioned hereinabove in connection with the prior art constructions in which only parts of simple design are used that may be readily manufactured at relatively low cost and easily installed within the space available between the brake disk and brake disk support.

A still further object of the present invention resides in the provision of a disk brake construction in which assembly inaccuracies can be readily absorbed by the particular mounting of the parts so as to avoid tilting or canting of the brake members with respect to the brake disk.

A further object of the present invention resides in the provision of a brake disk construction in which the readjusting mechanism or resetting mechanism is readily accessible from the outside thereof.

These and other objects, features and advantages of the present invention will become more obvious from the following description when taken in connection with the accompanying drawing which shows, for purposes of illustration only, one embodiment in accordance with the present invention, and wherein FIGURE 1 is an axial cross-sectional view through a disk brake for a motor vehicle provided with a mounting means of the brake clamp in accordance with the present invention, and FIGURE 2 is a side elevational view taken in the direction of arrow R of FIGURE 1 and displaced by 90° in relation to FIGURE 1, with the brake disk support removed for clarity's sake.

Referring now to the drawing wherein like reference numerals are used to designate corresponding parts in the two views thereof, reference numeral 1 designates therein an axle spindle or the like of a motor vehicle wheel on which is rotatably mounted, in any suitable known manner, a support or carrier 2 to which is secured the wheel rim or wheel felly 3. The carrier 2 includes a rim flange 4 which serves for purposes of retention of a brake disk 5. The brake disk 5 is surrounded inwardly thereof over a portion of the circumference by a brake clamp 6 which contains an actuating piston 7. Each piston slides within a cylinder space 8 which is closed off toward the outside by a cover 9. A brake lining support 10 is arranged between the brake disk 5 and the piston 7 which carries a brake friction lining 11. A brake lining support 12 engages by means of a brake friction lining 13, the brake disk 5 on the side opposite piston 7. For purposes of mounting and securing the brake clamp 6 in position thereof, a bracket 14 is provided which is connected in any suitable manner with the stationary axle spindle 1. The bracket 14 extends within the space 15 between the brake disk 5 and the support 2 and includes a headpiece 16 provided with an abutment surface 17. A leaf spring 19 is secured to the abutment surface 17 by means of screws or bolts 18. The leaf spring 19 is constructed as a fork-like form piece the leg portions 20 and 21 (FIGURE 2) of which extend along the bracket 14 and enclose therebetween the hub 23 of the wheel as well as the bearing pin 24 of the axle spindle 1. The free ends of the leg portions 20 and 21 are connected by means of screws 25 with the brake clamp 6 and hold the same in the assembled position with respect to the brake disk 5. The leaf spring 19 is traversed by an abutment or set screw 26 in proximity to the brake clamp 6, which screw 26 is threadably inserted into the bracket 14 and is rotatably retained therein by any known self-securing or self-locking means. The head 28 of the screw 26 is accessible from the outside to an adjusting key through an aperture 27.

Upon actuation of the brake, a pressure medium is supplied to the cylinder space 8 whereby the piston 7 presses the brake lining support 10 against the brake disk 5 so that the brake lining 11 thereof comes into frictional engagement with the brake disk 5. The abutment force thereby effects, after complete abutment of the friction lining 11, a deflection of the leaf spring 19 whereby the friction lining 13 of the lining support 12 also comes into abutment against the brake disk 5. Upon releasing the brake, the abutment moment of the piston 7 disappears whereby the leaf spring 19 returns to the initial position thereof. The wear of the lining 13 requires after a certain length of time of use of the vehicle a readjustment of the brake clamp 6 relative to the brake disk 5 which is effected by a further rotation of the set screw 26.

While I have shown and described one embodiment in accordance with the present invention it is understood that the same is not limited thereto but is susceptible of many changes and modifications within the spirit and scope thereof. For example, in the place of the fork-like leaf spring, a fully enclosed or endless springy form piece may be used which is provided with corresponding apertures for the passage of the axle parts. Additionally, it is possible to replace the readjustment mechanism of the brake clamp, carried out manually in the illustrated embodiment, by any suitable automatic readjusting mechanism of known construction.

Thus, it is quite obvious that the present invention is not limited to the details shown and described herein but is susceptible of many changes and modifications within the spirit and scope of the present invention, and I, therefore, do not wish to be limited to these details but intend to cover all such changes and modifications thereof as are encompassed by the scope of the appended claims.

I claim:

1. A disk brake construction for vehicles provided with a relatively stationary part, comprising brake disk means, one-piece brake clamp means surrounding said brake disk means and provided with brake engaging means on both sides of said brake disk means and with hydraulic brake actuating means therefor, abutment means supported from said relatively stationary part, and means supporting said brake clamp means on said relatively stationary part including a leaf spring resiliently mounting the same, said leaf spring being automatically tensioned so as to abut against said abutment means when the brake is released.

2. A disk brake construction for vehicles, comprising a relatively stationary part, brake disk means, one-piece brake clamp means surrounding said brake disk means and provided with brake engaging means on both sides of said brake disk means and with hydraulic brake actuating means on only one of the two sides operative to actuate thereby the corresponding brake engaging means, abutment means supported from said relatively stationary part, and means supporting said brake clamp means on said relatively stationary part including a leaf spring resiliently mounting said brake clamp means to actuate thereby the brake engaging means on the other side indirectly by said hydraulic brake actuating means, said spring being automatically tensioned so as to abut against said abutment means when the brake is released.

3. A disk brake construction for vehicles, comprising a relatively stationary part, brake disk means, one-piece brake clamp means surrounding said brake disk means and provided with brake engaging means on both sides of brake disc means and with hydraulic brake actuating means on only one of the two sides operative to actuate thereby the corresponding brake engaging means, and means supporting said brake clamp means on said relatively stationary part including a bracket member secured to said stationary part and a leaf spring secured to said bracket and to said brake clamp means, said hydraulic means thereby indirectly actuating the brake engaging means on the other side of said brake disk means through said leaf spring, said supporting means further including adjusting means operatively connected between said leaf spring and said bracket member, said adjusting means providing an abutment means against which said spring is automatically tensioned when the brake is released.

4. A disk brake construction for vehicles according to claim 3, wherein said adjusting means is a screw threaded into said bracket member, said screw serving as a means for compensation of the friction wear of the brake engaging means.

5. A disk brake construction for vehicles according to claim 4, wherein said disk brake construction is for a vehicle wheel provided with wheel carrier means, said stationary means being constituted by said wheel carrier means.

6. A disk brake construction for vehicles provided with a relatively stationary part, comprising brake disk means, one-piece brake clamp means surrounding said brake disk means and provided with brake engaging means on both sides of said brake disk means and with hydraulic brake actuating means therefor, means for supporting said brake clamp means on said relatively stationary part including a leaf spring resiliently mounting the same and a bracket means secured between said relatively stationary part and said spring, and abutment means comprising an adjustable screw threaded into said bracket means, said screw serving simultaneously as an adjusting device for compensation of the friction wear on the brake engaging means and said leaf spring being automatically tensioned against said abutment means when the brake is released.

References Cited in the file of this patent

UNITED STATES PATENTS 2,731,112    Berrows _____ Jan. 17, 1956

FOREIGN PATENTS 1,089,618    France _____ Oct. 6, 1954